(12) United States Patent
Wang

(10) Patent No.: US 10,729,603 B2
(45) Date of Patent: Aug. 4, 2020

(54) MANUAL ELECTRIC FOLDING SCOOTER

(71) Applicant: NANJING JIN BAI HE MEDICAL APPARATUS CO., LTD., Nanjing (CN)

(72) Inventor: Zhaowei Wang, Nanjing (CN)

(73) Assignee: Nanjing Jin Bai He Medical Apparatus Co., Ltd., Nanjing (CN)

( * ) Notice: Subject to any disclaimer, the term of this patent is extended or adjusted under 35 U.S.C. 154(b) by 230 days.

(21) Appl. No.: 15/996,050

(22) Filed: Jun. 1, 2018

(65) Prior Publication Data
US 2018/0271726 A1 Sep. 27, 2018

(30) Foreign Application Priority Data
Apr. 24, 2018 (CN) .......................... 2018 1 0371994

(51) Int. Cl.
| | | |
|---|---|---|
| *A61G 5/08* | (2006.01) | |
| *A61G 5/12* | (2006.01) | |
| *A61G 5/10* | (2006.01) | |
| *B62K 5/007* | (2013.01) | |
| *B62K 5/003* | (2013.01) | |
| *B62M 6/90* | (2010.01) | |
| *B62K 15/00* | (2006.01) | |
| *A61G 5/04* | (2013.01) | |

(52) U.S. Cl.
CPC .......... *A61G 5/0841* (2016.11); *A61G 5/1051* (2016.11); *A61G 5/128* (2016.11); *B62K 5/003* (2013.01); *B62K 5/007* (2013.01); *B62K 15/008* (2013.01); *B62M 6/90* (2013.01); *A61G 5/041* (2013.01); *A61G 5/0875* (2016.11)

(58) Field of Classification Search
CPC ...... B62K 5/025; B62K 5/007; B62K 15/006; B62K 15/008; B62K 15/00; B62K 2015/005
See application file for complete search history.

(56) References Cited

U.S. PATENT DOCUMENTS

| | | | | |
|---|---|---|---|---|
| 3,004,619 A | * | 10/1961 | Straussler | ............... B60F 5/003 180/208 |
| 7,654,356 B2 | * | 2/2010 | Wu | ........................ B62K 5/025 180/208 |
| 7,841,610 B2 | * | 11/2010 | Wang | ................... B62K 15/006 280/208 |

(Continued)

FOREIGN PATENT DOCUMENTS

| | | | |
|---|---|---|---|
| CN | 106585819 | * | 4/2017 |
| CN | 107010153 | * | 8/2017 |
| TW | 201604067 | * | 2/2016 |

*Primary Examiner* — Emma K Frick
(74) *Attorney, Agent, or Firm* — CBM Patent Consulting, LLC

(57) ABSTRACT

A manual electric folding scooter belongs to the technical field of medical instruments comprises a folding assembly, a push rod shaft and a rotating spindle arranged in turn, one end of an electric push rod is fixed in the push rod shaft, and the other end of the electric push rod is driven by a motor; the folding assembly comprises a hook shaft with both ends welded to a fixing plate, two reinforcing rods are symmetrically welded in the middle of the hook shaft, and the free ends of the reinforcing rods after passing through the symmetrically arranged fixing plate are arranged in sliding slots of frame fixing pieces on corresponding sides.

10 Claims, 9 Drawing Sheets

(56) References Cited

U.S. PATENT DOCUMENTS

| | | | | |
|---|---|---|---|---|
| 7,886,855 | B2* | 2/2011 | Wang | A61G 5/045 |
| | | | | 180/65.1 |
| 7,926,606 | B2* | 4/2011 | Wang | B62K 15/008 |
| | | | | 180/208 |
| 7,967,095 | B2* | 6/2011 | Kosco | B62K 15/008 |
| | | | | 180/208 |
| 8,388,006 | B2* | 3/2013 | Wu | B62K 5/00 |
| | | | | 180/180 |
| 8,746,730 | B2* | 6/2014 | Wu | B62B 3/02 |
| | | | | 280/639 |
| 9,265,675 | B2* | 2/2016 | Ransenberg | B62K 15/008 |
| 9,533,729 | B1* | 1/2017 | Chan | B62K 15/008 |
| 2005/0077097 | A1* | 4/2005 | Kosco | B62K 5/025 |
| | | | | 180/208 |
| 2016/0089285 | A1* | 3/2016 | Cheng | B62K 5/007 |
| | | | | 180/58 |
| 2018/0162480 | A1* | 6/2018 | Zhang | B62K 3/002 |
| 2019/0168837 | A1* | 6/2019 | Zhang | B62K 21/16 |
| 2019/0241230 | A1* | 8/2019 | Zhang | B62K 5/007 |
| 2019/0283831 | A1* | 9/2019 | Zhang | B62K 5/08 |
| 2020/0017159 | A1* | 1/2020 | Zhang | B62K 5/007 |
| 2020/0079460 | A1* | 3/2020 | Chan | B62K 5/06 |

* cited by examiner

MANUAL ELECTRIC FOLDING SCOOTER

This application claims priority to Chinese Patent Application Ser. No. CN201810371994.6 filed on 24 Apr. 2018.

TECHNICAL FIELD

The present invention belongs to the technical field of medical appliances, and more particularly, relates to a manual electric folding scooter.

BACKGROUND

An electric scooter which is mainly used for an electrically driven scooter, can move forwards, move backwards and corner, can be used indoors and outdoors, and is easy to operate.

The scooters on the current market are relatively heavy and cannot be folded and stored, occupy too much space when being placed, and cannot be carried on vehicles, and are inconvenient for the users. The structure of the scooter after being folded by a traditional folding method is still larger.

SUMMARY

Object of the present invention: the object of the present invention is to provide a manual electric folding scooter which is simple and compact in structure, has a smaller volume after being folded, can be easily folded without difficulty, and is convenient to carry in the meanwhile.

Technical solution: in order to achieve the above object of the invention, the technical solution adopted by the present invention is as follows.

A manual electric folding scooter comprises a headstock, a front frame pipe and a rear frame pipe connected in sequence, the two sides of the headstock are symmetrically provided with a front wheel, and the two sides of the rear frame pipe are provided with a rear wheel, the front frame pipe and the rear frame pipe are connected through a frame connecting piece, and frame fixing pieces are symmetrically arranged inside the front frame pipe, an electric push rod is arranged between the two rear wheels for using cooperatively, and a manual electric folding device is arranged between the front frame pipe and the rear frame pipe; the manual electric folding device comprises a folding assembly, a push rod shaft and a rotating spindle arranged in sequence, one end of the electric push rod is fixed in the push rod shaft, and the other end of the electric push rod is driven by a motor; the folding assembly comprises a hook shaft with both ends welded to a fixing plate, two reinforcing rods are symmetrically welded in the middle of the hook shaft, and the free ends of the reinforcing rods after passing through the symmetrically arranged fixing plate are arranged in sliding slots of frame fixing pieces on corresponding sides; the two ends of the rotating spindle after passing through the fixing plate respectively are installed on the frame connecting piece, a handle assembly is arranged in the rotating spindle, and the two ends of the push rod shaft are fixed in an half-slotted body; The electric or manual folding scooter is realized by clamping or releasing the hook shaft through the half-slotted body.

A front frame folding piece is symmetrically arranged inside the front frame pipe, and a rear frame folding piece is symmetrically arranged inside the rear frame pipe, one end of the front frame folding piece is fixed in the headstock through a shaft, and the other end of the front frame folding piece is fixed in a front end of the rear frame pipe through a shaft; one end of the rear frame folding piece is fixed in the frame fixing piece through the shaft, and the other end is fixed in a short seat pipe through a shaft.

The handle assembly comprises a handle piece and a handle grip, and the two ends of the handle piece are fixed in the rotating spindle through the handle grip.

A fixing assembly is covered above the half-slotted body, the fixing assembly comprises a rear positioning shaft, a front positioning shaft, a sliding fixing section and a waist slot, the rear positioning shaft and the front positioning shaft are symmetrically welded and fixed in the sliding fixing section, and the waist slot is symmetrically arranged at the two sides of the sliding fixing section.

Two tension springs are symmetrically arranged inside the sliding fixing section, one end of the tension spring is fixed in the rear positioning shaft, and the other end of the tension spring is fixed in the push rod shaft.

One end of the handle piece is fixed at an end portion of the handle grip, and the other end of the handle piece is fixed in the rotating spindle, and a protruded part of the handle piece is clamped between the rear positioning shaft and the front positioning shaft.

The half-slotted body comprises two symmetrically arranged slot pieces and a connecting section connecting the two slot pieces, and two ends of the slot piece are respectively provided with a bayonet and a fixing end, a reserved hole is arranged between the bayonet and the fixing end, one end of the slot piece is clamped on the hook shaft through the bayonet, and a rear end of the slot piece is sleeved in the rotating spindle through the fixing end; the reserved hole of the half-slotted body and the waist slot of the fixing assembly are overlapped to form two symmetrical fixing holes, and the two ends of the push rod shaft after passing through the fixing holes are tightened by a nut.

A cell box assembly is arranged between the rear frame pipes, and the cell box assembly comprises a lithium cell body, a lithium cell fixing chute and a discharge plug; the discharge plug is arranged at a bottom portion of the lithium cell fixing chute, and the lithium cell body is plugged in the lithium cell fixing chute.

The manual electric folding scooter after being folded is limited by a hook assembly; The hook assembly comprises a hook body, a first fixing member and a second fixing member; a hook body is fixed between the first fixing member and the second fixing member through a hook bolt and a fixing member screw; the hook assembly is fixed in the front frame pipe through the hook bolt and the fixing member screw; and a spring is fixed in a hole of the hook bolt.

A forward hook and a backward hook are arranged in the hook body to rotate the hook body around the second fixing member by an external force, there are two limiting points through the angle when the forward hook and the backward hook are unfolded and folded, the spring is popped out from at a limiting and fixed at the angle of the hook body; and the spring is hung at a first fixing point when being unfolded through a button of the hook bolt, and is hung at a second fixing point when being switched to a folded state.

Beneficial effects: compared with the prior art, the present invention is simple and compact in structure, can not only achieve manual folding, but also realize electric folding, has a smaller volume after being folded, can be easily folded without difficulty, and is convenient to carry in the meanwhile.

DETAILED DESCRIPTION

Figure 1:
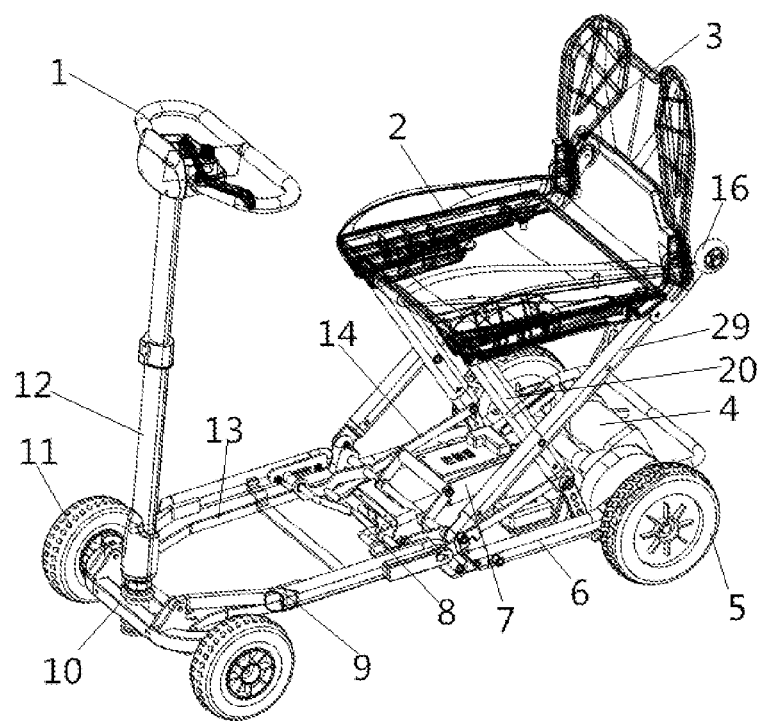
FIG. 1 is a front view of a manual electric folding scooter.
Figure 2:
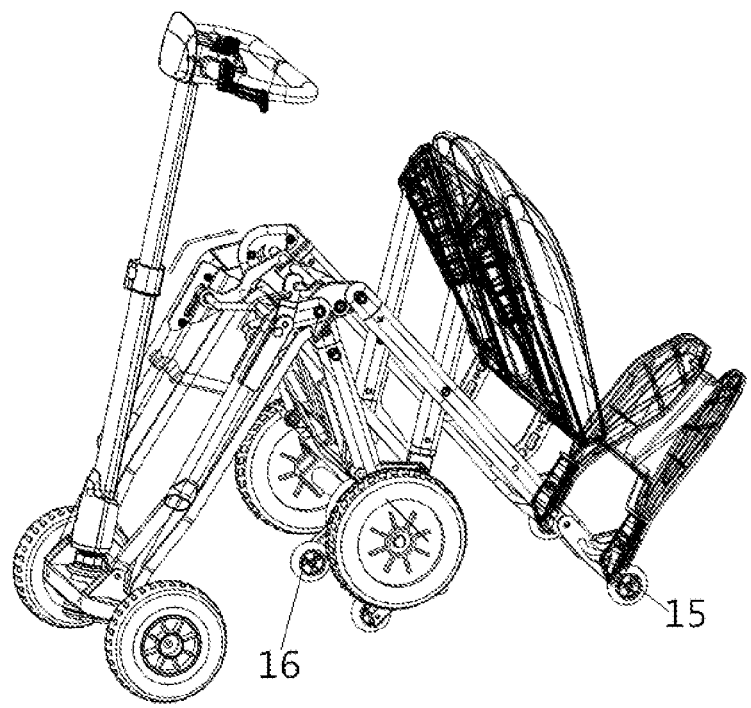
FIG. 2 is a schematic diagram of a folding process of the manual electric folding scooter.
Figure 3:
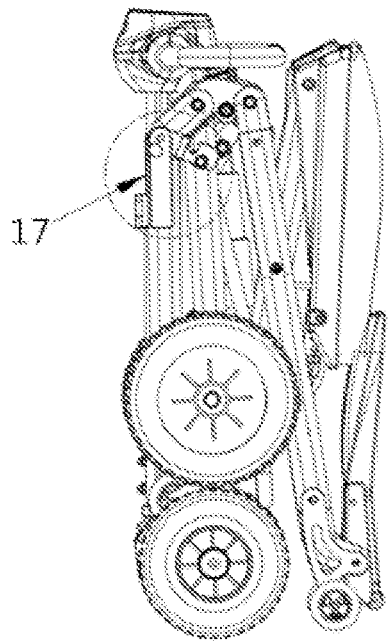
FIG. 3 is a structural schematic diagram of the manual electric folding scooter after being folded.
Figure 4:
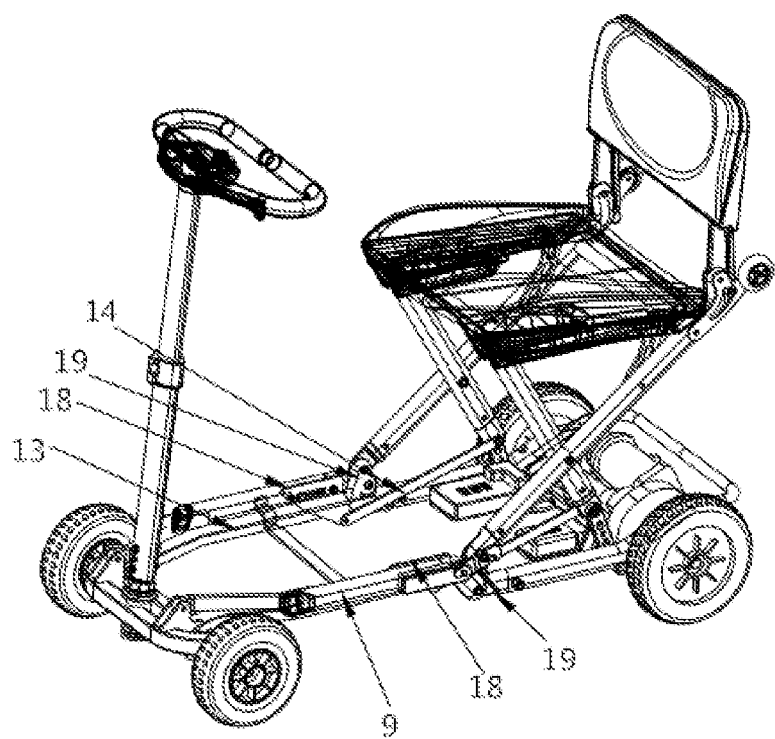
FIG. 4 is a schematic diagram of a bottom frame structure of the manual electric folding scooter.
Figure 5:
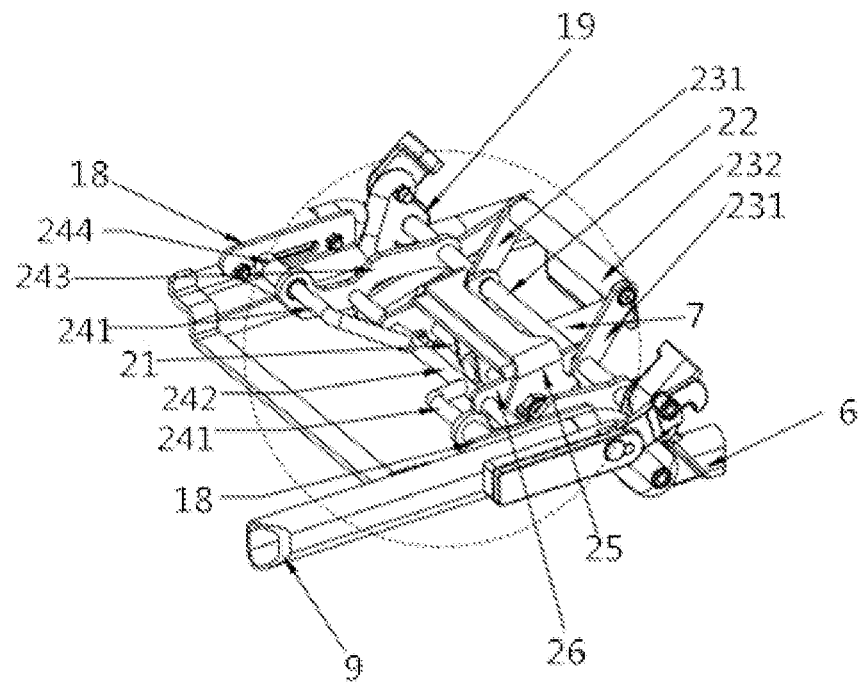
FIG. 5 is a structural schematic diagram of a manual electric folding device.
Figure 6:
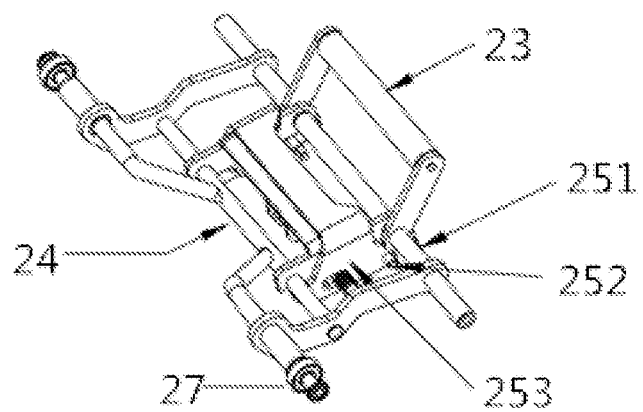
FIG. 6 is a structural schematic diagram of a manual electric folding member with a rolling bearing.
Figure 7:
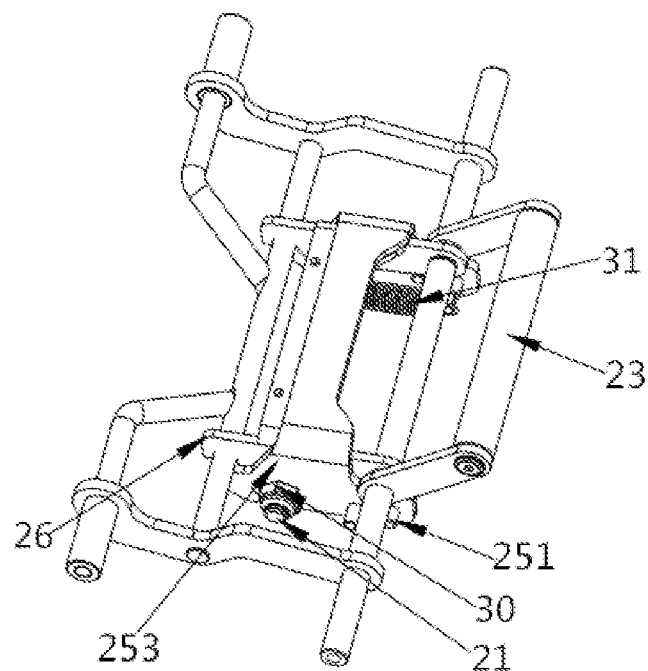
FIG. 7 is a structural schematic diagram of the manual electric folding part after being installed with a tension spring.
Figure 8:
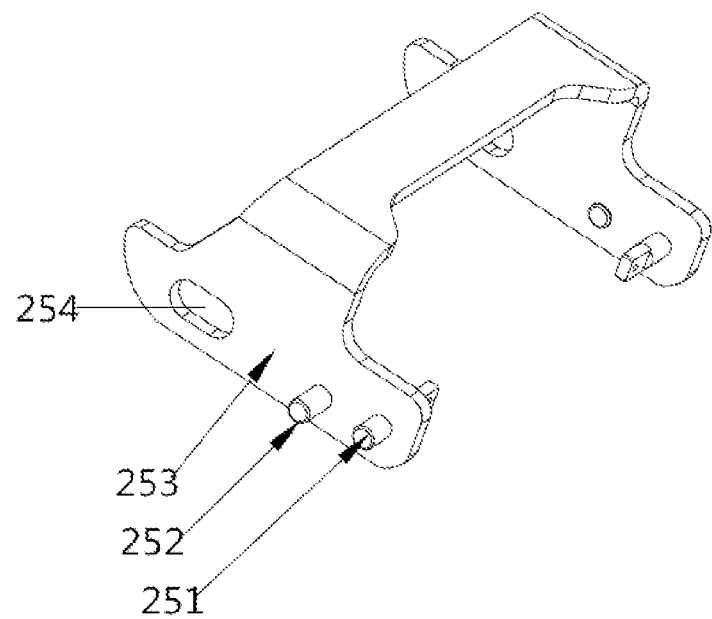
FIG. 8 is a structural schematic diagram of a fixing assembly.

The present invention will be further described hereinafter in detail with reference to the drawings and specific embodiments.

As shown in FIGS. 1 to 16, the reference numbers are as follows: 1 refers to handlebar, 2 refers to cushion, 3 refers to backrest, 4 refers to push rod motor, 5 refers to rear wheel, 6 refers to rear frame pipe, 7 refers to electric push rod, 8 refers to manual electric folding device, 9 refers to front frame pipe, 10 refers to headstock, 11 refers to front wheel, 12 refers to handlebar rod, 13 refers to front frame folding piece, 14 refers to rear frame folding piece, 15 refers to roller wheel, 16 refers to anti-rolling wheel, 17 refers to hook assembly, 18 refers to frame fixing piece, 19 refers to frame connecting piece, 20 refers to short seat pipe, 21 refers to push rod shaft, 22 refers to rotating spindle, 23 refers to handle assembly, 24 refers to folding assembly, 25 refers to fixing assembly, 26 refers to half-slotted body, 27 refers to rolling bearing, 28 refers to cell box assembly, 29 refers to long seat pipe 29, 30 refers to nut, 31 refers to tension spring, 32 refers to first fixing point, and 33 refers to second fixing point.

The hook assembly 17 comprises a hook body 171, a hook bolt 172, a first fixing member 173, a second fixing member 174, a fixing member screw 175 and a spring 176; the handle assembly 23 comprises a handle piece 231 and a handle 232; the folding assembly 24 comprises a reinforcing rod 241, a hook shaft 242, a fixing plate 243, and a fixing sleeve 244; the fixing assembly 25 comprises a rear positioning shaft 251, a front positioning shaft 252, a sliding fixing section 253 and a waist slot 254; the half-slotted body 26 comprises a bayonet 261, a fixing end 262, a connecting section 263 and a reserved hole 264; the cell box assembly 28 comprises a lithium cell body 281, a lithium cell fixing chute 282 and a discharge plug 283.

As shown in FIGS. 1 to 4, the manual electric folding scooter comprises a headstock 10, a front frame pipe 9 and a rear frame pipe 6 connected in sequence; the front frame pipe 9 and the rear frame pipe 6 are connected through a frame connecting piece 19, and a manual electric folding device 8 is arranged between the front frame pipe 9 and the rear frame pipe 6. The headstock 10 comprises a handlebar 1 and a handlebar rod 12, the handlebar 1 is arranged on the handlebar rod 12, and the handlebar rod 12 is fixed at a front end of the front frame pipe 9. The two sides of the headstock 10 are symmetrically provided with a front wheel 11. The two sides of the rear frame pipe 6 are provided with a rear wheel 5, and each rear wheel 5 is provided with an anti-rolling wheel 16 for using cooperatively. An electric push rod 7 is arranged between the two rear wheels 5 for using cooperatively, one end of the electric push rod 7 is fixed in the push rod shaft 21, and the other end of the electric push rod 7 is driven by a motor.

A seatback 3 is arranged on one side of a cushion 2, a long seat pipe 29 and a short seat pipe 20 are arranged below the cushion 2 for using cooperatively; the long seat pipe 29 and the short seat pipe 20 are arranged cross to each other through a rotary shaft, and both the long seat pipe 29 and the short seat pipe 20 are fixed in the rear frame pipe 6. A seat auxiliary folding piece is arranged below the cushion 2, one end of the seat auxiliary folding piece is fixed in the cushion 2, and the other end of the seat auxiliary folding piece is fixed in the long seat pipe 29. A backrest auxiliary folding piece is arranged between seat auxiliary folding piece and the backrest 3, one end of the backrest auxiliary folding piece is fixed in the seat auxiliary folding piece, and the other end of the seat auxiliary folding piece is fixed in the backrest 3. One end of the long seat pipe 29 close to the backrest 3 is provided with a roller wheel 15. The manual electric folding scooter after being folded is limited by a hook assembly 17.

A front frame folding piece 13 is symmetrically arranged inside the front frame pipe 9, a rear frame folding piece 14 is symmetrically arranged inside the rear frame pipe 6, and frame fixing pieces 18 are symmetrically arranged inside the front frame pipe 9. One end of the front frame folding piece 13 is fixed in the headstock 10 through a shaft, and the other end of the front frame folding piece is fixed at a front end of the rear frame pipe 6 through a shaft; one end of the rear frame folding piece 14 is fixed in the frame fixing piece 18 through a shaft, and the other end of the rear frame folding piece is fixed in the short seat pipe 20 through a shaft.

As shown in FIGS. 5 to 8, the manual electric folding device 8 comprises a push rod shaft 21, a rotating spindle 22, a handle assembly 23, a folding assembly 24, a fixing assembly 25, a half-slotted body 26 and a rolling bearing 27. The handle assembly 23 comprises a handle piece 231 and a handle grip 232, and the two ends of the handle piece are fixed in the rotating spindle 22 through the handle grip 232. The folding assembly 24 comprises reinforcing rods 241, a hook shaft 242, a fixing plate 243 and a fixing sleeve 244. The two ends of the hook shaft 242 are welded in the fixing plate 243. Two reinforcing rods 241 are symmetrically welded in the middle of the hook shaft 242. The reinforcing rods 241 pass through the fixing plate 243, and are arranged in open sliding slots of the frame fixing pieces 18 on corresponding sides through the fixing sleeve 244 and the rolling bearing 27. The two ends of the rotating spindle 22 after passing through the fixing plate 243 respectively are installed on the frame connecting piece 19.

The fixing assembly 25 comprises a rear positioning shaft 251, a front positioning shaft 252, a sliding fixing section 253 and a waist slot 254, the rear positioning shaft 251 and the front positioning shaft 252 are symmetrically welded and fixed in the sliding fixing section 253, and the waist slot 254 is symmetrically arranged at the two sides of the sliding fixing section 253. Two tension springs 31 are symmetrically arranged inside the sliding fixing section 253, one end of the tension spring 31 is fixed in the rear positioning shaft 251, and the other end of the tension spring is fixed in the push rod shaft 21.

Figure 9:
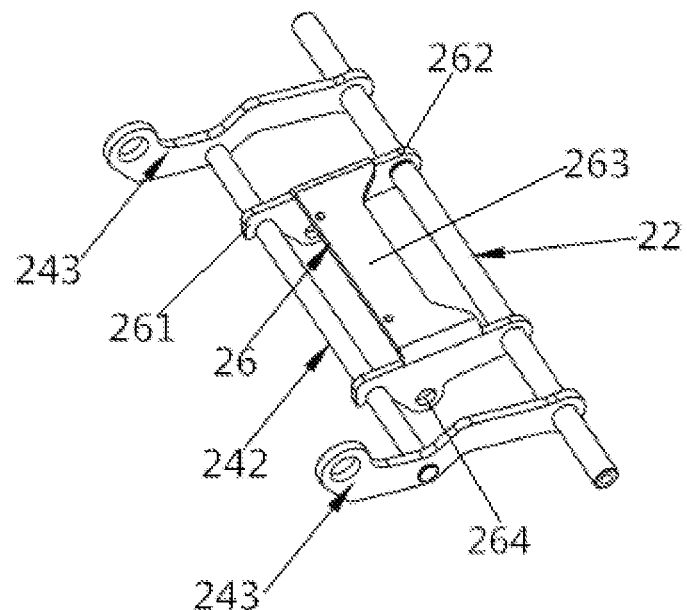
FIG. 9 is a schematic diagram of a half-slotted body installation structure.

As shown in FIG. 9, the half-slotted body 26 comprises two symmetrically arranged slot pieces and a connecting section 263 connecting the two slot pieces, and two ends of the slot piece are respectively provided with a bayonet 261 and a fixing end 262, a reserved hole 264 is arranged between the bayonet 261 and the fixing end 262, one end of the slot piece is clamped on the hook shaft 242 through the bayonet 261, and a rear end of the slot piece is sleeved in the rotating spindle 22 through the fixing end 262.

Figure 10:
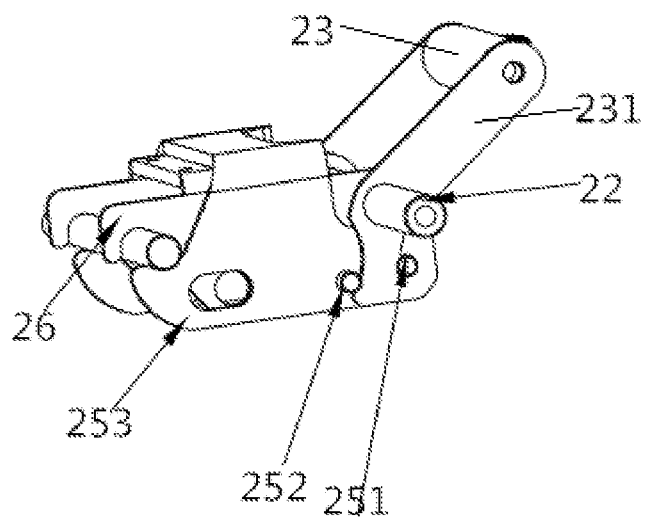
FIG. 10 is a structural schematic diagram of the half-slotted body after being assembled with the fixing assembly.

As shown in FIG. 10, one end of the handle piece 231 is fixed at an end portion of the handle grip 232, and the other end of the handle piece 231 is fixed in the rotating spindle 22, and a protruded part of the handle piece is clamped between the rear positioning shaft 251 and the front positioning shaft 252, and a user makes the sliding fixing section 253 move forwards and backwards through using the handle assembly 23 to poke and contact the rear positioning shaft 251 and the front positioning shaft 252 forwards and backwards. The reserved hole 264 of the half-slotted body 26 and the waist slot 254 of the fixing assembly 25 are overlapped to form two symmetrical fixing holes, and the two ends of the push rod shaft 21 after passing through the fixing holes are tightened by a nut 30.

The hook shaft 242 and the fixing plate 243 are integrally welded and assembled, and can rotate independently around the rotating spindle 22 when the electric push rod 7 does not move; The half-slotted body 26 is connected with the hook shaft 242 through the rotating spindle 22. Taking the rotating spindle 22 as a rotation point, the handle piece 231 is poked to move back and forth by taking the rear positioning shaft 251 and the front positioning shaft 252 as limiting points, thus making the fixing assembly 25 to move back and forth; When the handle piece 231 is pushed backwards, the front positioning shaft 252 is contacted to make the slide fixing section move forwards to lock the half-slotted body 26, and when the handle piece 231 is pushed forwards, the rear positioning shaft 251 is contacted to make the rear sliding fixing section 253 to move backwards to unlock the half-slotted body 26, so that the half-slotted body rotates about the rotating spindle 22.

Figure 11:
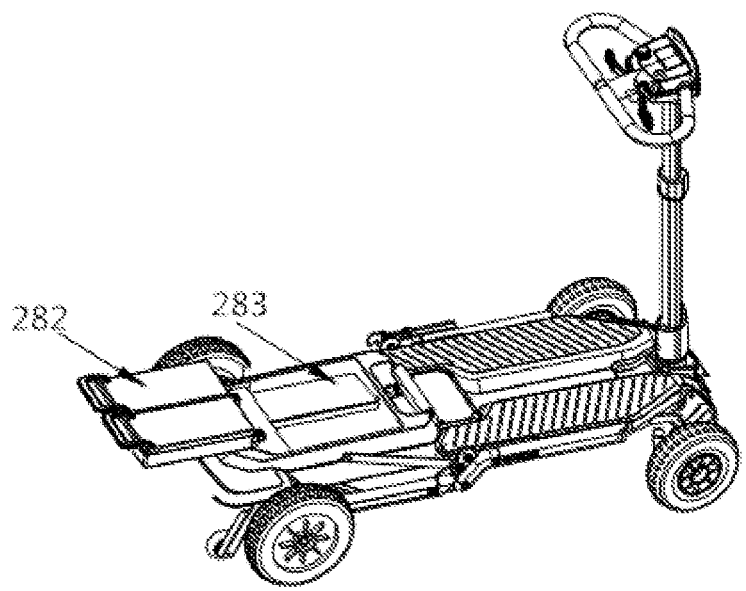
FIG. 11 is a schematic diagram illustrating an installation position of a cell box assembly of the manual electric folding scooter.
Figure 12:
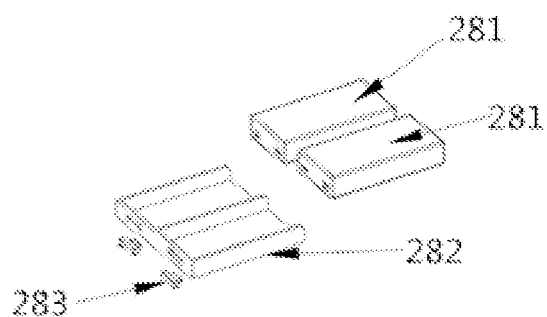
FIG. 12 is a structural schematic diagram of the cell box assembly.
Figure 13:
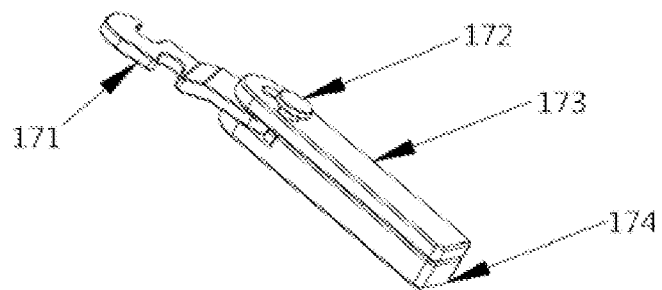
FIG. 13 is a structural schematic diagram of a hook assembly.
Figure 14:
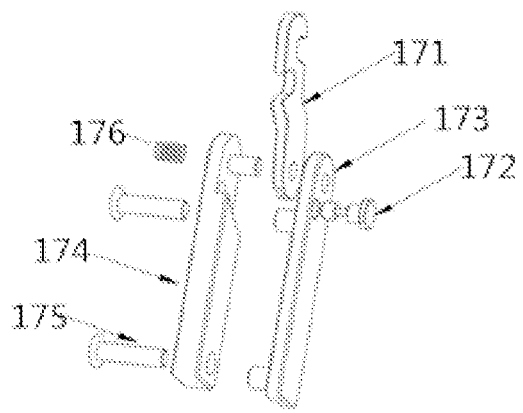
FIG. 14 is a structural schematic diagram of the hook assembly after being disassembled.
Figure 15:
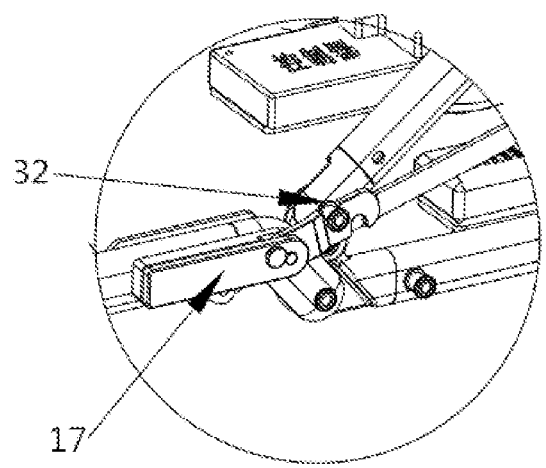
FIG. 15 is a schematic diagram of a hook fixing point when the manual electric folding scooter is unfolded.
Figure 16:
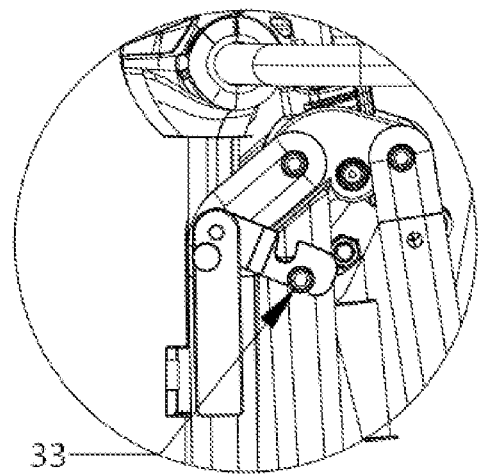
FIG. 16 is a schematic diagram of a hook fixing point when the manual electric folding scooter is folded.

As shown in FIGS. 11 to 12, a cell box assembly 28 is arranged between the rear frame pipes 6, and the cell box assembly 28 comprises a lithium cell body 281, a lithium cell fixing chute 282 and a discharge plug 283. A discharge plug 283 is arranged at a bottom portion of the lithium cell fixing chute 282, and a lithium cell body 281 is plugged in the lithium cell fixing chute 282, and is acted on a controller through discharge.

As shown in FIGS. 13 to 16, the hook assembly 17 comprises a hook body 171, a hook bolt 172, a first fixing member 173, a second fixing member 174, a fixing member screw 175 and a spring 176. The hook assembly 17 is fixed in the front frame pipe 9 through the hook bolt 172 and the fixing member screw 175. The hook body 171 is fixed between the first fixing member 173 and the second fixing member 174 through the hook bolt 172 and the fixing member screw 175.

A forward hook and a backward hook are arranged in the hook body 171 to rotate the hook body 171 around the second fixing member 174 by an external force, there are two limiting points through the angle when the forward hook and the backward hook are unfolded and folded, the spring 176 is popped out from at a limiting and fixed at the angle of the hook body 171. The spring 176 is fixed in a hole of the hook bolt 172, so that the hook bolt 172 acts as a button. The spring is hung at a first fixing point 32 when being unfolded through a button of the hook bolt 172, and is hung at a second fixing point 33 when being switched to a folded state, thus acting as a safe lock structure.

One-key mechanical linkage working process of the manual electric folding scooter: the handlebar rod 12 is kept upright, the front frame pipe 9 is folded upwards, the rear frame pipe 6 is folded downwards, and the two are combined; in the meanwhile, a cushion frame body is folded downwards near the rear frame pipe 6, and the front wheels 11 and the rear wheels 5 are folded together to complete the folding process. The control principle of the manual electric folding scooter is that the user controls a folding controller to transmit signals to drive a push rod controller to start the cell, drives the push rod motor, and the push rod motor drives the electric push rod 7 to protrude.

The manual electric folding scooter is realized by a multi-link structure, one group of rotating structures and three groups of plane link mechanisms. The folding assembly 24 rotates around the rotating spindle 22 and a "front frame assembly" is folded backwards, a "rear frame assembly" is folded upwards, and a "seat assembly" is folded downwards.

The front frame assembly is folded backwards, and the front frame assembly is folded backwards by the trajectory of the folding assembly 24 to the front frame pipe 9 and the front frame folding piece 13 (forming a parallelogram rotation structure).

The rear frame assembly is folded upwards and acts on the rear frame folding piece 14 by backwards folding the front frame pipe 9 to form a connecting and rotating structure, and cooperates with the backwards folded front frame pipe 9 to fold the rear frame pipe 6 upwards.

The seat assembly is folded downwards, and a quadrangular structure movement is formed through the change of an angle between the short seat pipe 20 and the long seat pipe 29, so that the seat assembly is folded downwards and moved.

The working process of the electric operation mode: the electric push rod 7 directly acts on the push rod shaft 21, so as to drive the half-slotted body 26 to rotate around the rotating spindle 22. The half-slotted body 26 is not unlocked. The bayonet 261 of the half-slotted body 26 always grips the hook shaft 242. The folding assembly 24 rotates to drive the fixing sleeve 244 to slide in the frame fixing piece 18 through the rolling bearing 27, so as to pull the folding assembly 24 to rotate around the rotating spindle 22 entirely, so as to drive the front frame pipe 9 and the rear frame pipe 6 to fold or unfold.

The working process of the manual operation mode: an external force is applied to the handle grip 232 to poke the handle piece 231 forwards and backwards to push the fixing assembly 25 to move back and forth to unlock the half-slotted body 26. At this time, the electric push rod 7 does not move and leans against the push rod shaft 21, limiting the half-slotted body 26 to actuate, so that the folding assembly 24 can be manually moved to perform a manual folding function. At this time, the bayonet 26 of the half-slotted body 26 releases the hook shaft 242 and an external force acts on the handle grip 232 to pull the half-slotted body 26 upwards, so that the folding assembly 24 rotates to drive the fixing sleeve 244 to slide in the frame fixing piece 18 through the rolling bearing 27, so as to drive the front frame pipe 9 and the rear frame pipe 6 to fold or unfold.

What is claimed is:

1. A manual electric folding scooter, comprising a headstock (10), a front frame pipe (9) and a rear frame pipe (6) connected in sequence, two sides of the headstock (10) are symmetrically provided with a front wheel (11), and the two sides of the rear frame pipe (6) are provided with a rear wheel (5), wherein front frame pipe (9) and the rear frame pipe (6) are connected through a frame connecting piece (19), and frame fixing pieces (18) are symmetrically arranged inside the front frame pipe (9), an electric push rod (7) is arranged between the two rear wheels (5) for using cooperatively, and a manual electric folding device (8) is arranged between the front frame pipe (9) and the rear frame pipe (6); the manual electric folding device (8) comprises a folding assembly (24), a push rod shaft (21) and a rotating spindle (22) arranged in sequence, one end of the electric push rod (7) is fixed in the push rod shaft (21), and other end of the electric push rod (7) is driven by a motor; the folding assembly (24) comprises a hook shaft (242) with two ends of the hook shaft (242) welded to a fixing plate (243), two reinforcing rods (241) are symmetrically welded in middle of the hook shaft (242), and free ends of the reinforcing rods (241) after passing through the symmetrically arranged fixing plate (243) are arranged in sliding slots of the frame fixing pieces (18) on corresponding sides; two ends of the rotating spindle (22) after passing through the fixing plate (243) respectively are installed on the frame connecting piece (19), a handle assembly (23) is arranged in the rotating spindle (22), and two ends of the push rod shaft (21) are fixed in an half-slotted body (26).

2. The manual electric folding scooter according to claim 1, wherein a front frame folding piece (13) is symmetrically arranged inside the front frame pipe (9), and a rear frame folding piece (14) is symmetrically arranged inside the rear frame pipe (6), one end of the front frame folding piece (13) is fixed in the headstock (10) through a first shaft, and the other end of the front frame folding piece is fixed in a front end of the rear frame pipe (6) through a second shaft; one end of the rear frame folding piece (14) is fixed in the frame fixing piece (18) through a third shaft, and the other end of the rear frame folding piece is fixed in a short seat pipe (20) through a fourth shaft.

3. The manual electric folding scooter according to claim 1, wherein the handle assembly (23) comprises a handle piece (231) and a handle grip (232), and two ends of the handle piece (231) are fixed in the rotating spindle (22) through the handle grip (232).

4. The manual electric folding scooter according to claim 3, wherein a fixing assembly (25) is covered above the half-slotted body (26), the fixing assembly (25) comprises a rear positioning shaft (251), a front positioning shaft (252), a sliding fixing section (253) and a waist slot (254), the rear positioning shaft (251) and the front positioning shaft (252) are symmetrically welded and fixed in the sliding fixing section (253), and the waist slot (254) is symmetrically arranged at two sides of the sliding fixing section (253).

5. The manual electric folding scooter according to claim 4, wherein two tension springs (31) are symmetrically arranged inside the sliding fixing section (253), one end of the tension spring (31) is fixed in the rear positioning shaft (251), and the other end of the tension spring is fixed in the push rod shaft (21).

6. The manual electric folding scooter according to claim 5, wherein one end of the handle piece (231) is fixed at an end portion of the handle grip (232), and the other end of the handle piece is fixed in the rotating spindle (22), and a protruded part of the handle piece is clamped between the rear positioning shaft (251) and the front positioning shaft (252).

7. The manual electric folding scooter according to claim 4, wherein the half-slotted body (26) comprises two symmetrically arranged slot pieces and a connecting section (263) connecting the two slot pieces, and two ends of the slot piece are respectively provided with a bayonet (261) and a fixing end (262), a reserved hole (264) is arranged between the bayonet (261) and the fixing end (262), one end of the slot piece is clamped on the hook shaft (242) through the bayonet (261), and a rear end of the slot piece is sleeved in the rotating spindle (22) through the fixing end; the reserved hole (264) of the half-slotted body (26) and the waist slot (254) of the fixing assembly (25) are overlapped to form two symmetrical fixing holes, and the two ends of the push rod shaft (21) after passing through the fixing holes are tightened by a nut (30).

8. The manual electric folding scooter according to claim 1, wherein a cell box assembly (28) is arranged between the rear frame pipe (6), and the cell box assembly (28) comprises a lithium cell body (281), a lithium cell fixing chute (282) and a discharge plug (283); the discharge plug (283) is arranged at a bottom portion of the lithium cell fixing chute (282), and the lithium cell body (281) is plugged in the lithium cell fixing chute (282).

9. The manual electric folding scooter according to claim 1, wherein the manual electric folding scooter after being folded is limited by a hook assembly (17); the hook assembly (17) comprises a hook body (171), a first fixing member (173) and a second fixing member (174); a hook body (171) is fixed between the first fixing member (173) and the second fixing member (174) through a hook bolt (172) and a fixing member screw (175); the hook assembly (17) is fixed in the front frame pipe (9) through the hook bolt (172) and the fixing member screw (175); and a spring (176) is fixed in a hole of the hook bolt (172).

10. The manual electric folding scooter according to claim 9, wherein a forward hook and a backward hook are arranged in the hook body (171) to rotate the hook body (171) around the second fixing member (174) by an external force, there are two limiting points through an angle when the forward hook and the backward hook are unfolded and folded, the spring (176) is popped out from at a limiting and fixed at an angle of the hook body (171); and the spring is hung at a first fixing point (32) when being unfolded through a button of the hook bolt (172), and is hung at a second fixing point (33) when being switched to a folded state.

* * * * *